United States Patent
Escribano et al.

(10) Patent No.: US 10,922,669 B2
(45) Date of Patent: Feb. 16, 2021

(54) SYSTEM AND METHOD FOR FACILITATING A COMBINED PURCHASE OF ONLINE AND IN-STORE PRODUCTS

(71) Applicant: MASTERCARD ASIA/PACIFIC PTE. LTD., Singapore (SG)

(72) Inventors: Raul Escribano, Singapore (SG); Veronica Kuoh, Singapore (SG); Tobias Puehse, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 176 days.

(21) Appl. No.: 16/188,149

(22) Filed: Nov. 12, 2018

(65) Prior Publication Data

US 2019/0188669 A1 Jun. 20, 2019

(30) Foreign Application Priority Data

Dec. 19, 2017 (SG) .......................... 10201710549V (51) Int. Cl.
| | |
|---|---|
| *G06Q 20/18* | (2012.01) |
| *G06Q 20/12* | (2012.01) |
| *G06Q 20/20* | (2012.01) |
| *G06Q 20/32* | (2012.01) |
| *G07G 1/00* | (2006.01) |
| *G06Q 30/06* | (2012.01) |

(52) U.S. Cl.
CPC ........... *G06Q 20/201* (2013.01); *G06Q 20/12* (2013.01); *G06Q 20/18* (2013.01); *G06Q 20/204* (2013.01); *G06Q 20/208* (2013.01); *G06Q 20/3276* (2013.01); *G07G 1/0036* (2013.01); *G06Q 30/0633* (2013.01)

(58) Field of Classification Search
None
See application file for complete search history.

(56) References Cited

U.S. PATENT DOCUMENTS

| 8,626,595 B2 * | 1/2014 | Chung | G06Q 30/0603 |
| | | | 705/26.1 |
| 2012/0215584 A1 * | 8/2012 | Narsude | G06Q 30/02 |
| | | | 705/7.29 |
| 2013/0282586 A1 * | 10/2013 | Ovick | G06Q 20/405 |
| | | | 705/44 |

* cited by examiner

*Primary Examiner* — Paul Danneman (57) ABSTRACT

System and method for facilitating a combined purchase of online products and in-store products. The system comprising a payment processor module that is configured to: (i) receive data corresponding to: (a) a total price of one or more in-store products to be purchased at a physical store; (b) a total price of one or more online products to be purchased using an e-commerce platform; and (c) a combined payment amount for the in-store and the online products made by a purchaser of the in-store and the online products during a check-out procedure; and (ii) generate a product release message on a condition that the combined payment amount corresponds with the total price of the in-store products and the total price of the online products.

20 Claims, 4 Drawing Sheets

SYSTEM AND METHOD FOR FACILITATING A COMBINED PURCHASE OF ONLINE AND IN-STORE PRODUCTS

CROSS-REFERENCE TO RELATED APPLICATION

This application claims the benefit of and priority to Singapore Patent Application No. 10201710549V filed Dec. 19, 2017. The entire disclosure of the above application is incorporated herein by reference.

FIELD

The present disclosure relates broadly, but not exclusively, to systems and methods for facilitating a combined purchase of online and in-store products.

BACKGROUND

This section provides background information related to the present disclosure which is not necessarily prior art.

Merchants are facing increasing retail estate cost and e-commerce pressure. In particular, merchants that deal with fast-moving consumer goods (e.g., perishable meat, fruits, vegetables, dairy products, beverages, and toiletries) face the most pressure as many of these fast-moving consumer goods take up a lot of physical space in the merchant's premises. However, consumers of these fast-moving consumer goods are reluctant to move their purchases online due to the perishable nature of these goods. For example, consumers would rather visit a supermarket to buy perishables instead of using the supermarket's e-commerce platform because the perishables that are purchased online and eventually delivered are often inconsistent in quality and may not meet consumers' requirements of freshness and other criteria.

Some of these fast-moving consumer goods may not be perishable, such as canned foods, beverages and toiletries. Consumers may be more receptive to purchasing such non-perishable goods using the supermarket's e-commerce platform because freshness is not a priority and products are of consistent quality. However, consumers are currently not able to purchase both perishables from the merchant's premises and non-perishables using the merchant's e-commerce platform and check-out via a single transaction. In other words, a consumer may need to pay for perishables at a point-of-sale terminal at the merchant's premises and separately purchase non-perishables through the merchant's e-commerce platform using their smartphone. This also creates fragmented data about consumers' shopping baskets.

In another example scenario, a consumer visits a retail store where some products are available but others are not. For example, the consumer visits an apparel store and purchases a dress in-store. However, matching shoes are not available in-store in the correct size and therefore the consumer has to order the shoes on-line and separately make payment for the shoes. In other words, the consumer is currently not able to make payment for the dress and shoes via a single transaction.

A need therefore exists to provide systems and methods for facilitating a combined purchase of online and in-store products that seek to address at least some of the above problems.

SUMMARY

This section provides a general summary of the disclosure, and is not a comprehensive disclosure of its full scope or all of its features. Aspects and embodiments of the disclosure are set out in the accompanying claims.

According to a first aspect, there is provided a system for facilitating a combined purchase of online products and in-store products. The system comprises a payment processor module that is configured to: (i) receive data corresponding to: (a) a total price of one or more in-store products to be purchased at a physical store; (b) a total price of one or more online products to be purchased using an e-commerce platform; and (c) a combined payment amount for the in-store and the online products made by a purchaser of the in-store and the online products during a check-out procedure; and (ii) generate a product release message on a condition that the combined payment amount corresponds with the total price of the in-store products and the total price of the online products.

According to a second aspect, there is provided a method for facilitating a combined purchase of online products and in-store products, comprising: (i) receiving, at a payment processor module, data corresponding to: (a) a total price of one or more in-store products to be purchased at a physical store; (b) a total price of one or more online products to be purchased using an e-commerce platform; and (c) a combined payment amount for the in-store products and the online products made by a purchaser of the in-store products and the online products during a check-out procedure; and (ii) generating, at the payment processor module, a product release message on a condition that the combined payment amount corresponds with the total price of the in-store products and the total price of the online products.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments and implementations are provided by way of example only, and will be better understood and readily apparent to one of ordinary skill in the art from the following written description, read in conjunction with the drawings, in which.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure. And again, like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. The construction of more specialized apparatus to perform the required method steps may also be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the present disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on such a computer effectively results in an apparatus that implements the steps of the method(s) herein.

Embodiments relate to systems and methods for facilitating purchase of products. In particular, embodiments enable consumers to purchase both physical products from a merchant's physical store and digital products using the merchant's e-commerce platform (e.g., online shopping website) via a single check-out procedure.

In the following description, "physical products" refers to products (e.g., goods, items, services, etc.) that are found in a merchant's physical store and can be taken away from the physical store after check-out. The equivalent term "in-store products" may be used interchangeably in the following description. On the other hand, "digital products" refers to products that are available for purchase using the merchant's e-commerce platform and are delivered to the consumer after check-out. The equivalent term "online products" may be used interchangeably in the following description.

In the following description, "e-commerce platform" refers to hardware and/or software modules that facilitate e-commerce, i.e., buying and selling of goods and services or transmitting of funds or data over an electronic network, primarily the internet. An example of a software module is a mobile application that can be downloaded and installed on a consumer's mobile device. The consumer can use the mobile application to select one or more digital products for purchase. The mobile application can be linked to (or include) a digital wallet module to facilitate payment of the purchased products. In the following description, the term "module" can refer to software, a hardware element, or a combination of both.

In an example scenario, a consumer enters a supermarket and places physical products that he wishes to purchase into a physical shopping cart. Before he leaves the supermarket, the consumer uses his mobile phone to access the supermarket's online shopping website or shopping mobile application to select digital products that he wishes to purchase. The website or user interface of the mobile application may display the digital products for sale along with a price and description, and the consumer can select the desired digital products. The website or mobile application provides a virtual shopping cart that contains a list of all the selected digital products.

Once the consumer has finished selecting all the physical products and digital products that he wishes to purchase, he can proceed to check-out before leaving the supermarket. All the items in the physical shopping cart and virtual shopping cart are "merged" and the consumer can check-out via a single transaction and can either pay via a digital payment method using the e-commerce platform or in-store via a traditional point-of-sale (POS) terminal system. The POS terminal system has HMTL 5 or other similar application capabilities to facilitate the single check-out procedure.

If the consumer wishes to pay in-store, the merchant scans all the physical products in the physical shopping cart (e.g., as per the current practice of a cashier scanning a bar-code associated with each physical product) and acquires encoded data from the user device. In one implementation, the encoded data may be in the form of machine-readable code, such as a QR-code or bar-code, that is displayed on the online shopping website or the shopping mobile application on the user device. The encoded data includes at least the total price of all digital products in the virtual shopping cart and a unique transaction identifier encoded therein. The unique transaction identifier is associated with the purchased digital products and in particular the origin, transaction number, merchant category code (MCC) and/or unique ID of an electronic device that was used to purchase the digital products (i.e., device ID).

The merchant can scan the QR-code or bar-code to acquire the encoded data. In another implementation, the encoded data may be provided in the form of transmittable-data (e.g., the transmittable-data is transmitted via contactless (NFC) transmission from the consumer's mobile phone to a NFC-enabled POS terminal). The transmittable-data includes the total price of all digital products in the virtual shopping cart and a unique transaction identifier. A combined payment amount for the physical and the digital products can be determined because the total price of the physical products to be purchased in-store is established by the in-store POS terminal while the total price of digital products to be purchased using the e-commerce platform is known through the encoded data. Thereafter, the consumer pays the full amount (i.e., a combined payment amount for the physical and the digital products) at the in-store POS terminal before leaving the merchant's store. The digital products are released on a condition that the full amount paid by the consumer matches the determined combined payment amount for the physical and the digital products. In this manner, the matching of amounts is used as a first factor of verification.

The unique transaction identifier can be used as a second factor of verification. For example, the unique transaction identifier, received as part of the encoded data, can be compared to a reference unique transaction identifier, and the digital products are released on a condition that the received unique transaction identifier matches the reference unique transaction identifier.

If the consumer wishes to pay via the e-commerce platform, the merchant scans all the physical products in the physical shopping cart and the in-store POS terminal generates encoded data, which may be provided in the form of a machine-readable code (e.g., a QR-code, bar-code) or transmittable-data. The encoded data includes at least the total price of all physical products in the physical shopping cart and a unique transaction identifier encoded therein. The consumer acquires the encoded data by scanning the machine-readable code (e.g., by scanning the QR-code with his mobile device) or receiving the transmittable-data with the mobile device, so that the mobile application can obtain the total price of all physical products in the physical shopping cart and the unique transaction identifier. In this manner, a combined payment amount for the physical and the digital products can be determined because the e-commerce platform obtains the total price of the physical products to be purchased at a physical store via the encoded data while the total price of the digital products to be purchased using the e-commerce platform is known. The consumer pays the full amount (i.e., a combined payment amount for the physical and the digital products) via a digital payment method (e.g., a digital wallet application) before leaving the store. The physical products are released on a condition that the full amount paid by the consumer matches the determined combined payment amount for the physical and the digital products. In this manner, the matching of amounts is used as a first factor of verification.

The unique transaction identifier can be used as a second factor of verification. For example, the unique transaction identifier received as part of the encoded data can be compared to a reference unique transaction identifier, and the physical products are released on a condition that the received unique transaction identifier matches the reference unique transaction identifier.

In either case, the full amount paid by a particular consumer is reconciled with the total price of the physical products and the total price of the digital products that the particular consumer has purchased. This reconciliation step can be performed at a central module (e.g., a merchant data warehouse or a payment processor module). If the full amount paid by the particular consumer corresponds with the total price of the physical products and the total price of the digital products that the particular consumer has purchased, a digital receipt and/or a product release message can be generated by the central module. In addition to determining whether the full amount paid matches the total price of the physical and digital products, the central module can also be configured to verify that the identity of the payer matches the identity of the purchaser.

In addition to determining whether the full amount paid matches the total price of the physical and digital products, the central module can also be configured to verify that a unique transaction identifier received as part of the encoded data matches a reference unique transaction identifier. The reference unique transaction identifier is associated with the purchased digital products (or physical products, as the case may be), and in particular the origin, transaction number, merchant category code (MCC) and/or unique ID of an electronic device that was used to purchase the digital products (or in the case of physical products, the payment terminal or POS terminal that was used at the merchant's store). In one implementation, a sequential transaction identifier, optionally with a check digit, can be generated and assigned to each transaction. The check digit is a form of redundancy check for error detection. In another implementation, the transaction identifier can be a random number. In yet another implementation, the unique transaction identifier is generated based on data corresponding to one or more of: the purchased digital products (or physical products, as the case may be), the origin, transaction number, merchant category code (MCC) and unique ID of an electronic device that was used to purchase the digital products (or in the case of physical products, the payment terminal or POS terminal that was used at the merchant's store).

The unique transaction identifier that is generated may be stored in a memory module of the central module as a reference unique transaction identifier and subsequently used for verification. In this manner, the unique transaction identifier can be used as a second factor of verification wherein the unique transaction identifier received as part of the encoded data is compared to the reference unique transaction identifier, and the digital products (or physical products, as the case may be) are released on a condition that the received unique transaction identifier matches the reference unique transaction identifier.

The product release message comprises an instruction to a payment terminal or POS system at the supermarket to release the physical products to the particular consumer and/or an instruction to a payment gateway module associated with the e-commerce platform to release the digital products to the particular consumer. The digital products can then be delivered to the consumer.

On the other hand, if the full amount paid by the particular consumer does not tally with the total price of the physical products and the total price of the digital products that the particular consumer has purchased, a transaction failure message may be generated and transmitted to a payment terminal or POS system at the supermarket and/or the payment gateway module. Likewise, if the identity of the payer does not match the identity of the purchaser, a transaction failure message may be generated and transmitted to the supermarket and/or the payment gateway module.

Figure 1:
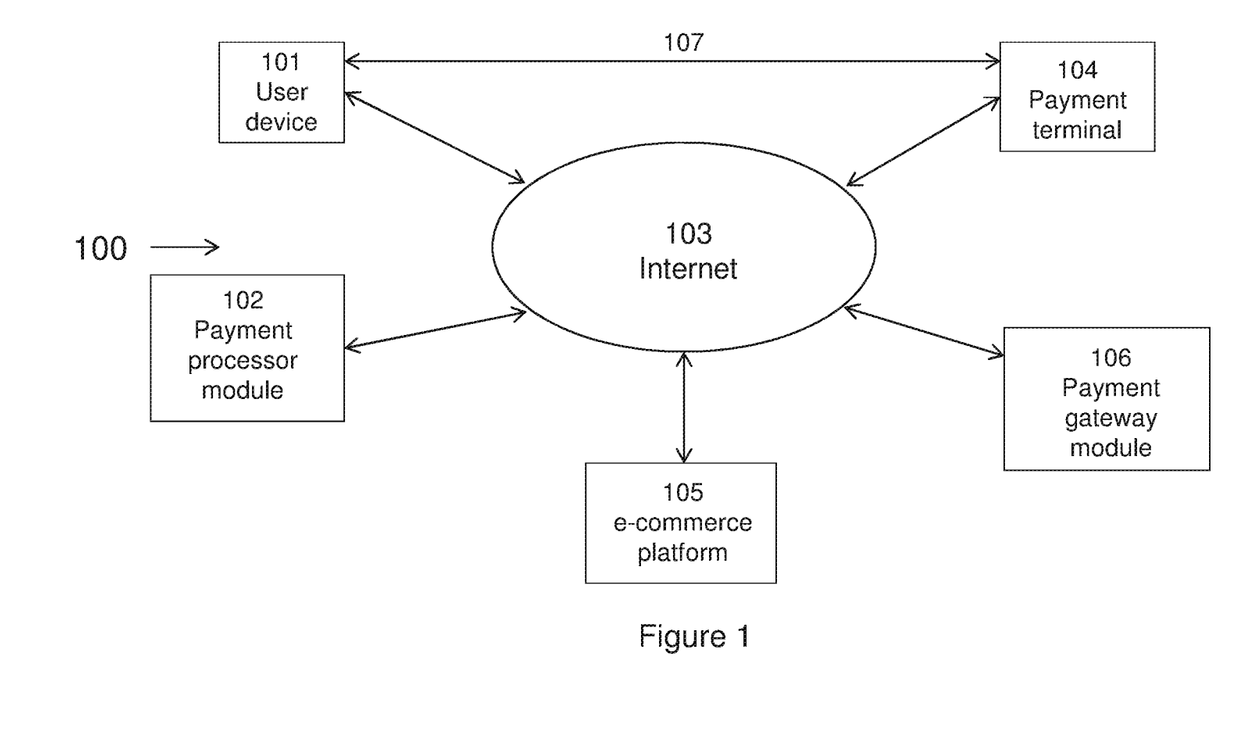
FIG. 1 shows a schematic of a system for facilitating a combined purchase of online and in-store products, according to an example embodiment.

FIG. 1 shows a schematic of a system 100 for facilitating a combined purchase of online and in-store products, according to an example embodiment. The system 100 includes a payment processor module 102, a payment terminal 104 (e.g., a point-of-sale (POS) device) and a payment gateway module 106. The processor module 102, the payment terminal 104 and the payment gateway module 106 can each be connected to the Internet 103 so that communication can be established between the various components 102, 104 and 106. At least one user device can be connected to the Internet 103 so that communication can be established between the user device 101 and at least one of the components 102, 104 and 106 when necessary. For illustration purposes, only one user device 101 is shown in FIG. 1, but any number of user devices can be in communication with the system 100.

The payment processor module 102 is configured to receive a message comprising data corresponding to: (i) a total price of one or more physical (i.e., in-store) products to be purchased at a physical store; (ii) a total price of one or more digital (i.e., online) products to be purchased using an e-commerce platform 105; and (iii) a combined payment amount for the physical and the digital products made by a purchaser of the physical and the digital products during a single check-out procedure. The payment processor module 102 can be configured to determine whether the combined payment amount corresponds with the total price of the physical products and the total price of the digital products.

After receipt of the above-mentioned data (i), (ii) and (iii), the payment processor module 102 is configured to generate a product release message on a condition that the combined payment amount corresponds with the total price of the physical products and the total price of the digital products.

The payment processor module 102 can be further configured to receive data corresponding to: (iv) a unique user identity associated with the purchaser of the physical and the digital products; and (v) a payment scheme associated with the check-out procedure.

Online Electronic Payment

The payment scheme associated with the check-out procedure may be an online electronic payment transaction performed using the e-commerce platform 105. In such a case, the product release message comprises an instruction to a merchant associated with the physical store to release the physical products to the purchaser of the physical and the digital products associated with the unique user identity. The payment processor module 102 may be further configured to transmit the product release message to the point-of-sale (POS) device 104 located at the physical store.

The payment processor module 102 may be further configured to receive data corresponding to a product identifier associated with each of the physical products, and the product release message may comprise a further instruction to the merchant associated with the physical store to release the physical products associated with the respective product identifier to the purchaser of the physical and the digital products associated with the unique user identity.

The POS device 104 may be configured to encode the data corresponding to the total price of the one or more physical products to be purchased at the physical store. In one implementation, the encoded data may be in the form of a machine readable code (e.g., a QR-code). The POS device 104 preferably has HMTL 5 or other similar application capabilities. The machine readable code is readable 107 by the mobile user device 101 that is capable of supporting purchase of the digital products via the e-commerce platform 105. The mobile user device 101 may be a portable computing device, such as a smartphone or tablet computer.

The product release message may further comprise an instruction to a merchant associated with the e-commerce platform 105 to release the digital products to the purchaser of the physical and the digital products associated with the unique user identity.

The above-mentioned data (i), i.e., total price of one or more physical products, may be received at the payment processor module 102 from the mobile user device 101.

The above-mentioned data (ii) and (iii), i.e., total price of one or more digital products and combined payment amount for the physical and the digital products, respectively, may be received at the payment processor module 102 from a payment gateway module associated with the e-commerce platform 105.

In an implementation, a unique transaction identifier can be generated (e.g., at the payment processor module 102) for each transaction associated with a purchase of the physical products. In particular, the unique transaction identifier may be associated with one more or more of: origin, transaction number, merchant category code (MCC) and terminal or device ID of the payment terminal 104 that was used at the merchant's store. The unique transaction identifier can be transmitted to the payment terminal 104. The payment terminal 104 may be further configured to generate the unique transaction identifier. In either case, the payment terminal 104 may be further configured to encode the unique transaction identifier in the encoded data. In this manner, the mobile user device 101 can receive the unique transaction identifier for use as a second factor of verification as described above.

In-Store Electronic Payment

The payment scheme associated with the check-out procedure may be an in-store electronic payment transaction performed at the physical store. In such a case, the product release message comprises an instruction to a merchant associated with the e-commerce platform 105 to release the digital products to the purchaser of the physical and the digital products associated with the unique user identity. The payment processor module 102 may be further configured to transmit the product release message to a payment gateway module 106 associated with the e-commerce platform 105.

The payment processor module 102 may be further configured to receive data corresponding to a product identifier associated with each of the digital products, and the product release message may comprise a further instruction to the merchant associated with the e-commerce platform 105 to release the digital products associated with the respective product identifier to the purchaser of the physical and the digital products associated with the unique user identity.

The payment gateway module 106 may be configured to encode the data corresponding to the total price of the one or more digital products to be purchased using the e-commerce platform 105. In one implementation, the encoded data may be in the form of a machine readable code (e.g., a QR-code). The machine readable code is readable by the POS device 104 located at the physical store.

The product release message may further comprise an instruction to a merchant associated with the physical store to release the physical products to the purchaser of the physical and the digital products associated with the unique user identity.

The above-mentioned data (i), (ii) and (iii), i.e., total price of one or more physical products, total price of one or more digital products and combined payment amount for the physical and the digital products, respectively, may be transmitted by the POS device 104 to the payment processor module 102.

In an implementation, a unique transaction identifier can be generated (e.g., at the payment gateway module 106, the payment processor module 102 or the e-commerce platform 105) for each transaction associated with a purchase of the digital products. In particular, the unique transaction identifier can be associated with one more or more of: origin, transaction number, merchant category code (MCC) and device ID of the user device 101 that was used to purchase the digital products. The generated unique transaction identifier can be transmitted to the user device 101. The payment terminal 104 can receive the unique transaction identifier from the user device 101 for use as a second factor of verification as described above.

Figure 2A:
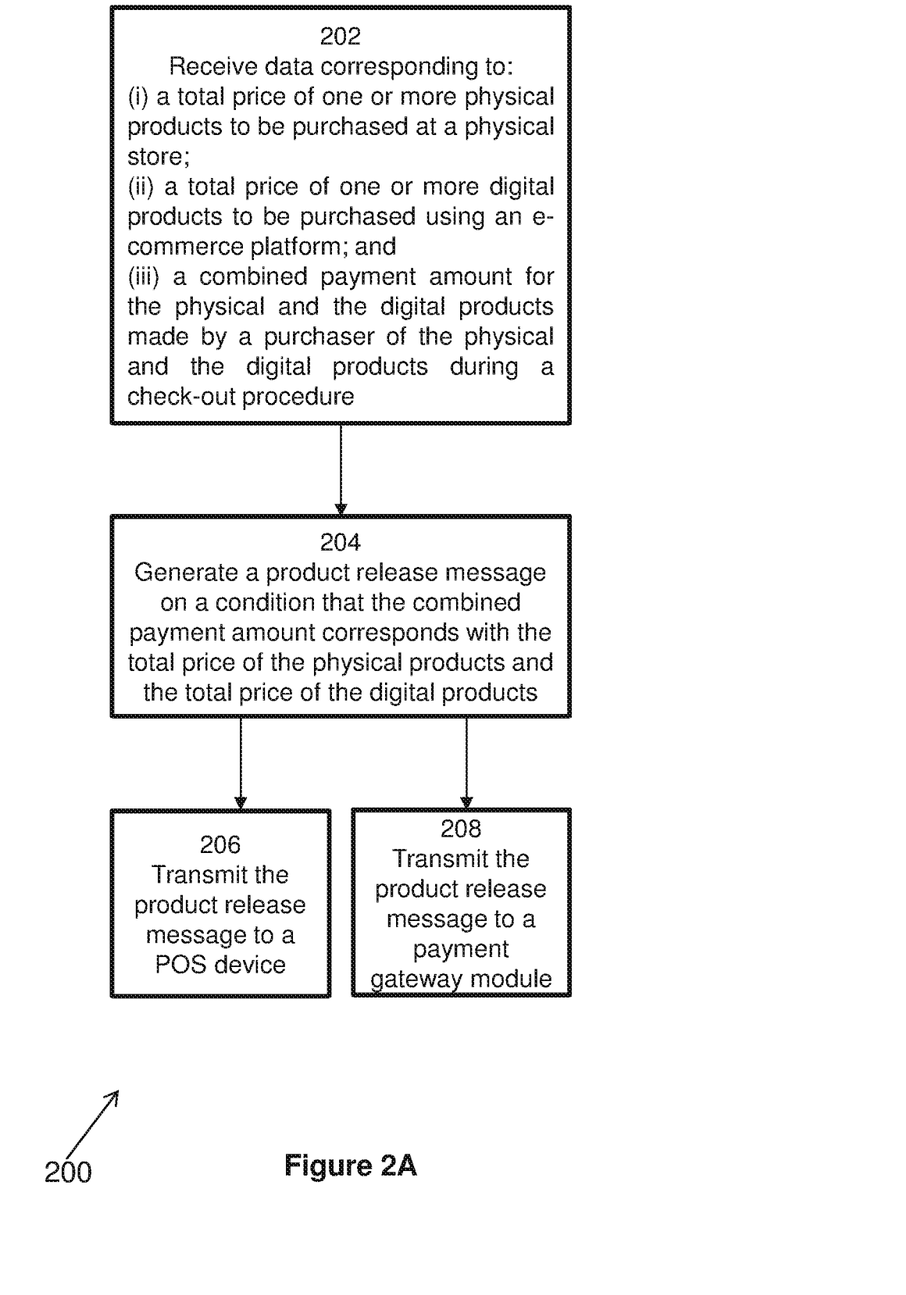
FIG. 2A shows a flow chart illustrating a method for facilitating a combined purchase of online and in-store products, according to an example embodiment.

FIG. 2A shows a flow chart illustrating a method 200 performed at the payment processor module for facilitating in-store purchase of products, according to an example embodiment. The method 200 includes step 202, which involves receiving, at a payment processor module, data corresponding to: (i) a total price of one or more physical products to be purchased at a physical store; (ii) a total price of one or more digital products to be purchased using an e-commerce platform; and (iii) a combined payment amount for the physical and the digital products made by a purchaser of the physical and the digital products during a check-out procedure.

At step 204, a product release message is generated at the payment processor module on a condition that the combined payment amount corresponds with the total price of the physical products and the total price of the digital products. Prior to step 204, the payment processor may compare the combined payment amount with the total price of the physical and the digital products to determine if the combined payment amount corresponds with the total price of the physical and the digital products.

The method 200 may further include receiving, at the payment processor module, a message comprising data corresponding to: (iv) a unique user identity associated with the purchaser of the physical and the digital products; (v) a payment scheme associated with the check-out procedure; and/or (vi) a unique transaction identifier. The unique transaction identifier is associated with the purchased digital products (or physical products, as the case may be) and in particular the origin, transaction number, merchant category code (MCC) and/or unique ID of an electronic device that was used to purchase the digital products (or in the case of physical products, the payment terminal or POS terminal that was used at the merchant's store).

If the payment scheme associated with the check-out procedure comprises an online electronic payment transaction performed using the e-commerce platform, the product release message comprises an instruction to a merchant associated with the physical store to release the physical products to the purchaser of the physical and the digital products associated with the unique user identity.

In the case of an online electronic payment transaction being performed using the e-commerce platform, the method 200 may further include receiving, at the payment processor module, data corresponding to a product identifier associated with each of the physical products. The product release message comprises an indication to a point-of-sale (POS) device located at the physical store that payment was successful for all the physical products. Alternatively or in addition, the product release message comprises a further instruction to the merchant associated with the physical store to release the physical products associated with the respective product identifier to the purchaser of the physical and the digital products associated with the unique user identity.

The method 200 may further include a step 206 of transmitting the product release message from the payment processor module to a point-of-sale (POS) device located at the physical store.

The method 200 may also include a step of encoding, at the POS device, the data corresponding to the total price of the one or more physical products to be purchased at the physical store on a machine readable code. The machine readable code is readable by a mobile device that is capable of supporting purchase of the digital products using the e-commerce platform.

On the other hand, if the payment scheme associated with the check-out procedure comprises an in-store electronic payment transaction performed at the physical store, the product release message comprises an instruction to a merchant associated with the e-commerce platform to release the digital products to the purchaser of the physical and the digital products associated with the unique user identity.

In the case of an in-store electronic payment transaction being performed at the physical store, the method 200 may further include receiving, at the payment processor module, data corresponding to a product identifier associated with each of the digital products. The product release message comprises a further instruction to the merchant associated with the e-commerce platform to release the digital products associated with the respective product identifier to the purchaser of the physical and the digital products associated with the unique user identity.

The method 200 may further include a step 208 of transmitting the product release message from the payment processor module to a payment gateway module associated with the e-commerce platform.

The method 200 may also include a step of encoding, at the payment gateway module, the data corresponding to the total price of the one or more digital products to be purchased using the e-commerce platform on a machine readable code. The machine readable code is readable by a point-of-sale (POS) device located at the physical store.

Figure 2B:
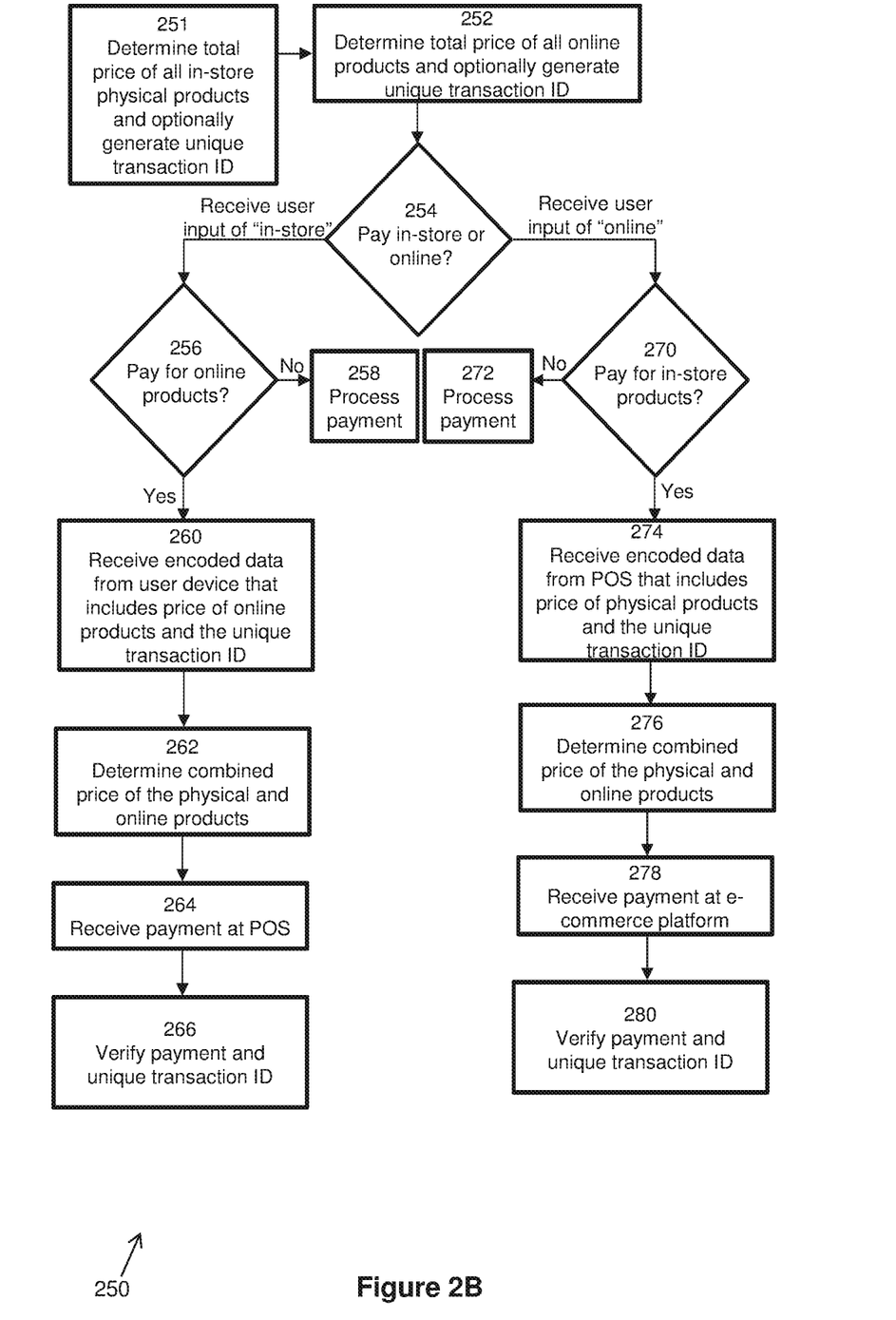
FIG. 2B shows a flow chart illustrating a method for facilitating a combined purchase of online and in-store products, according to an example embodiment.

FIG. 2B shows a flow chart illustrating a method 250 for facilitating the purchase of products, according to an example embodiment. At step 251, a consumer wishes to purchase some physical products at a merchant's store and the total price of the physical products is determined at an in-store POS terminal. A first unique transaction ID that is associated with the purchase of the physical products may be generated by the POS terminal.

At step 252, the consumer also wishes to purchase some online products using his smartphone at the merchant's e-commerce website and the total price of the online products is determined at an e-commerce platform. A second unique transaction ID that is associated with the purchase of the online products may be generated by the e-commerce platform.

The first unique transaction ID and the second unique transaction ID may be two distinct unique transaction IDs, or the same unique transaction ID that can be used by both the in-store POS terminal and the e-commerce platform.

At step 254, the consumer can decide whether to pay in-store or online. At step 256, if the consumer decides to pay in-store, (a) the consumer can voluntarily choose to simultaneously pay for the online products that he/she wishes to purchase; or (b) the merchant can choose to ask the consumer to simultaneously pay for the online products. If the consumer does not wish to simultaneously pay for his physical and online products, the payment transaction is processed as per current practice (i.e., payment at a POS terminal for physical products only) at step 258. If the consumer wishes to simultaneously pay for his physical and online products, the POS terminal receives encoded data from the consumer's smartphone at step 260. The encoded data comprises a total price of the online products and, if applicable, the unique transaction ID that is associated with the purchase of the online products. At step 262, the combined price of the physical products and online products is determined based on the total price of the physical products (determined at step 251) and the total price of the online products (known from the encoded data received at step 260). At step 264, the consumer makes a single payment for the physical and online products at the in-store POS terminal. At step 266, the single payment amount is verified (i.e., whether it matches the combined price of the physical products and online products determined at step 262). Optionally, at step 266, the unique transaction ID that is associated with the purchase of the online products is verified as a second factor of verification. In particular, the unique transaction ID that is received at step 260 as part of the encoded data has to match the unique transaction ID that is generated at step 252. Upon successful verification, at step 266, an online product message is transmitted to the e-commerce platform.

At step 270, if the consumer decides to pay online, (a) the consumer can voluntarily chose to simultaneously pay for physical products that he/she wishes to purchase; or (b) the merchant can choose to ask the consumer to simultaneously pay for the physical products. If the consumer does not wish to simultaneously pay for his physical and online products, the payment transaction is processed as per current practice (i.e., as an online payment transaction for the online products only) at step 272. If the consumer wishes to simultaneously pay for his physical and online products, the consumer's smartphone receives encoded data from the POS terminal at step 274. The encoded data comprises a total price of the physical products and, if applicable, the unique transaction ID that is associated with the purchase of the physical products. The smartphone can forward the encoded data to the e-commerce platform. At step 276, the combined price of the physical products and online products is determined based on the total price of the physical products (known from the encoded data received at step 274) and the total price of the online products (known by the e-commerce platform). At step 278, the consumer makes a single payment for the physical and online products at the merchant's e-commerce website using his smartphone. At step 280, the single payment amount is verified (i.e., whether it matches the combined price of the physical products and online products determined at step 276). Optionally, at step 276, the unique transaction ID that is associated with the purchase of the physical products is verified as a second factor of verification. In particular, the unique transaction ID that is received at step 274 as part of the encoded data has to match the unique transaction ID that is generated at step 251. Upon successful verification, at step 280, a physical product message is transmitted to the POS terminal.

Figure 3:
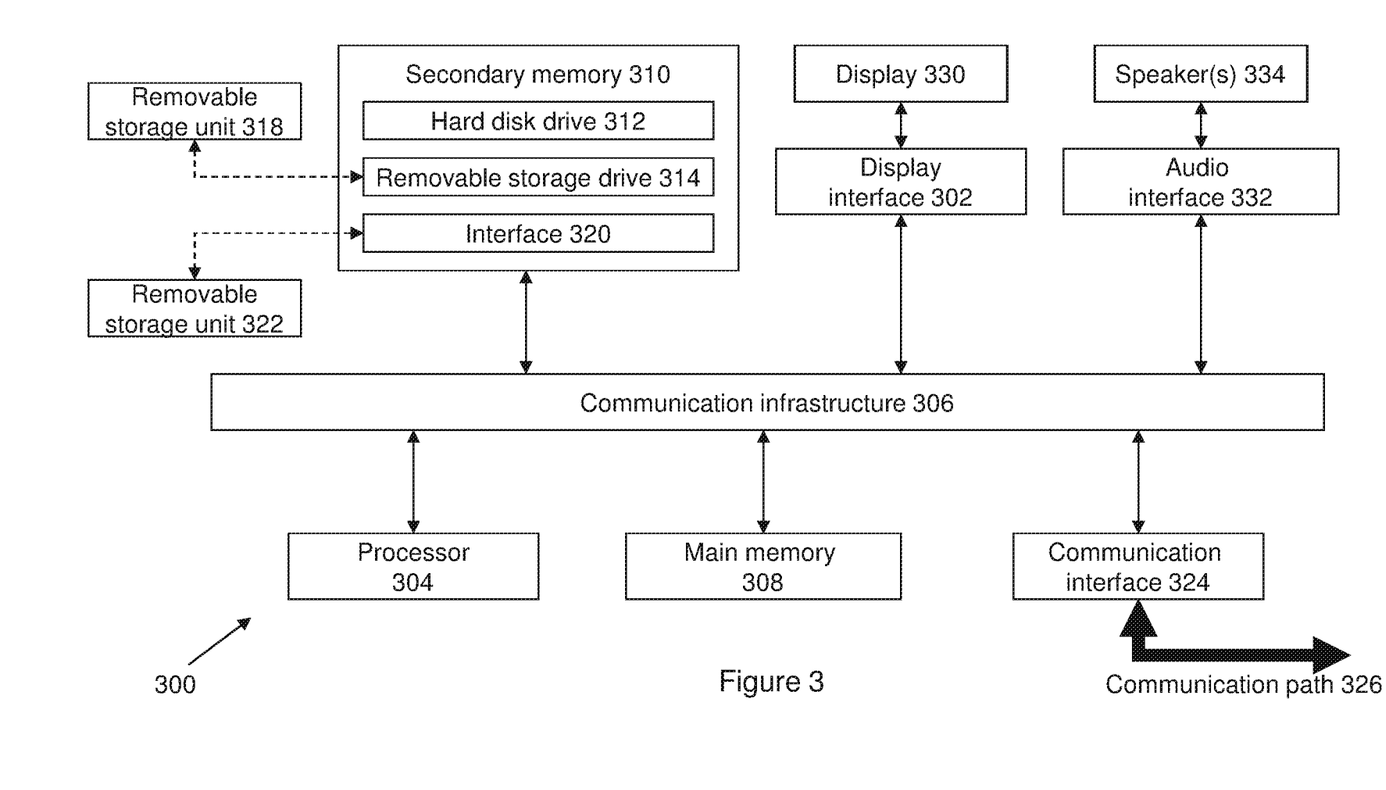
FIG. 3 shows a schematic diagram of a computer system suitable for use in executing one or more steps of the method for facilitating a combined purchase of online and in-store products according to example embodiments.

FIG. 3 shows a schematic diagram of a computer device/system 300 suitable for use in executing one or more steps of the above-described methods for facilitating a combined purchase of online and in-store products. One or more such computing devices 300 may be used to execute the above-described methods for facilitating a combined purchase of online and in-store products. In addition, one or more components of the computer system 300 may be used to realize the system 100, payment processor module 102, and/or payment gateway module 106. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a hard disk drive 312 and/or a removable storage drive 314, which may include a magnetic tape drive, an optical disk drive, or the like. The removable storage drive 314 reads from and/or writes to a removable storage unit 318 in a well-known manner. The removable storage unit 318 may include a magnetic tape, optical disk, or the like, which is read by and written to by removable storage drive 314. As will be appreciated by persons skilled in the relevant art(s), the removable storage unit 318 includes a computer readable storage medium having stored therein computer executable program code instructions and/or data.

In another implementation, the secondary memory 310 may additionally or alternatively include other similar means for allowing computer programs or other instructions to be loaded into the computing device 300. Such means can include, for example, a removable storage unit 322 and an interface 320. Examples of a removable storage unit 322 and interface 320 include a program cartridge and cartridge interface (such as that found in video game console devices), a removable memory chip (such as an EPROM or PROM) and associated socket, and other removable storage units 322 and interfaces 320 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the disclosure, the communication interface 324 permits data to be transferred between the computing device 300 and a data communication network, such as a public data or private data communication network. The communication interface 324 may be used to exchange data between different computing devices 300 which such computing devices 300 form part of an interconnected computer network. Examples of a communication interface 324 can include a modem, a network interface (such as an Ethernet card), a communication port, an antenna with associated circuitry, and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage unit 318, removable storage unit 322, a hard disk installed in hard disk drive 312, or a carrier wave carrying software over communication path 326 (wireless link or cable) to communication interface 324. Computer readable storage media refers to any non-transitory tangible storage medium that provides recorded instructions and/or data to the computing device 300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card, such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the hard disk drive 312, or the interface 320. The computer program product may also be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments, one or more features of the computing device 300 may be omitted. Also, in some embodiments, one or more features of the computing device 300 may be combined together. Additionally, in some embodiments, one or more features of the computing device 300 may be split into one or more component parts.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for facilitating a combined purchase of online products and in-store products, the system comprising:
 a processor programmed to:
  receive data corresponding to: a total price of one or more in-store products to be purchased at a physical store, a total price of one or more online products to be purchased using an e-commerce platform, and a combined payment amount paid by a purchaser during a single check-out procedure to pay for the one or more in-store products and the one or more online products;

determine that the combined payment amount paid during the single check-out procedure corresponds with the total price of the one or more in-store products and the total price of the one or more online products; and generate a product release message responsive to the determination that the combined payment amount paid corresponds with the total price of the one or more in-store products and the total price of the one or more online products.

2. The system as claimed in claim 1, wherein the processor is further programmed to receive data corresponding to: a unique user identity associated with the purchaser of the one or more in-store products and the one or more online products, and a payment scheme associated with the single check-out procedure.

3. The system as claimed in claim 2, wherein the payment scheme comprises an online payment transaction performed using the e-commerce platform, and wherein the product release message comprises an instruction to a merchant associated with the physical store to release the one or more in-store products to the purchaser of the one or more in-store products and the one or more online products associated with the unique user identity.

4. The system as claimed in claim 3, wherein the processor is further programmed to receive data corresponding to a respective product identifier associated with each of the one or more in-store products, and wherein the product release message comprises a further instruction to the merchant associated with the physical store to release the one or more in-store products associated with the respective product identifier to the purchaser of the one or more in-store products and the one or more online products associated with the unique user identity.

5. The system as claimed in claim 3, wherein the processor is further programmed to transmit the product release message to a point-of-sale (POS) device located at the physical store.

6. The system as claimed in claim 5, wherein the POS device is to encode the data corresponding to the total price of the one or more in-store products to be purchased at the physical store on a machine readable code, and wherein the machine readable code is readable by a mobile device of the purchaser that is used to pay for the combined payment amount to pay for the one or more in-store products and the one or more online products using the e-commerce platform.

7. The system as claimed in claim 2, wherein the payment scheme comprises a payment transaction performed at the physical store, and wherein the product release message comprises an instruction to a merchant associated with the e-commerce platform to release the one or more online products to the purchaser of the one or more in-store products and the one or more online products associated with the unique user identity.

8. The system as claimed in claim 7, wherein the processor is further programmed to receive data corresponding to a respective product identifier associated with each of the one or more online products, and wherein the product release message comprises a further instruction to the merchant associated with the e-commerce platform to release the one or more online products associated with the respective product identifier to the purchaser of the one or more in-store products and the one or more online products associated with the unique user identity.

9. The system as claimed in claim 7, wherein the processor is further programmed to transmit the product release message to a payment gateway module associated with the e-commerce platform.

10. The system as claimed in claim 1, wherein the processor is further programmed to:

receive a unique transaction identifier during the single check-out procedure; and generate the product release message further responsive to a determination that the received unique transaction identifier corresponds with a reference unique transaction identifier, wherein the received unique transaction identifier and the reference unique transaction identifier both correspond to either the one or more in-store products to be purchased at the physical store or the one or more online products to be purchased using the e-commerce platform.

11. A method for facilitating a combined purchase of online products and in-store products, the method comprising:

receiving, by a processor, data corresponding to: a total price of one or more in-store products to be purchased at a physical store, a total price of one or more online products to be purchased using an e-commerce platform, and a combined payment amount paid by a purchaser during a single check-out procedure to pay for the one or more in-store products and the one or more online products;

determining, by the processor, that the combined payment amount paid during the single check-out procedure corresponds with the total price of the one or more in-store products and the total price of the one or more online products; and generating, by the processor, a product release message responsive to the determination that the combined payment amount paid corresponds with the total price of the one or more in-store products and the total price of the one or more online products.

12. The method as claimed in claim 11, further comprising:

receiving, by the processor, data corresponding to: a unique user identity associated with the purchaser of the one or more in-store products and the one or more online products, and a payment scheme associated with the single check-out procedure.

13. The method as claimed in claim 12, wherein the payment scheme comprises an online payment transaction performed using the e-commerce platform, and wherein the product release message comprises an instruction to a merchant associated with the physical store to release the one or more in-store products to the purchaser of the one or more in-store products and the one or more online products associated with the unique user identity.

14. The method as claimed in claim 13, further comprising:

receiving, by the processor, data corresponding to a respective product identifier associated with each of the one or more in-store products, wherein the product release message comprises a further instruction to the merchant associated with the physical store to release the one or more in-store products associated with the respective product identifier to the purchaser of the one or more in-store and the one or more online products associated with the unique user identity.

15. The method as claimed in claim 13, further comprising:
    transmitting the product release message to a point-of-sale (POS) device located at the physical store.

16. The method as claimed in claim 15, further comprising:
    encoding, at the POS device, the data corresponding to the total price of the one or more in-store products to be purchased at the physical store on a machine readable code, wherein the machine readable code is readable by a mobile device of the purchaser that is used to pay for the combined payment amount to pay for the one or more in-store products and the one or more online products using the e-commerce platform.

17. The method as claimed in claim 12, wherein the payment scheme comprises a payment transaction performed at the physical store, and wherein the product release message comprises an instruction to a merchant associated with the e-commerce platform to release the one or more online products to the purchaser of the one or more in-store products and the one or more online products associated with the unique user identity.

18. The method as claimed in claim 17, further comprising:
    receiving, by the processor, data corresponding to a respective product identifier associated with each of the one or more online products, wherein the product release message comprises a further instruction to the merchant associated with the e-commerce platform to release the one or more online products associated with the respective product identifier to the purchaser of the one or more in-store products and the one or more online products associated with the unique user identity.

19. The method as claimed in claim 17, further comprising:
    transmitting the product release message to a payment gateway module associated with the e-commerce platform.

20. The method as claimed in claim 11, further comprising:
    receiving a unique transaction identifier during the single check-out procedure; and
    generating the product release message is further responsive to a determination that the received unique transaction identifier corresponds with a reference unique transaction identifier, wherein the received unique transaction identifier and the reference unique transaction identifier both correspond to either the one or more in-store products to be purchased at the physical store or the one or more online products to be purchased using the e-commerce platform.

* * * * *